UNITED STATES PATENT OFFICE.

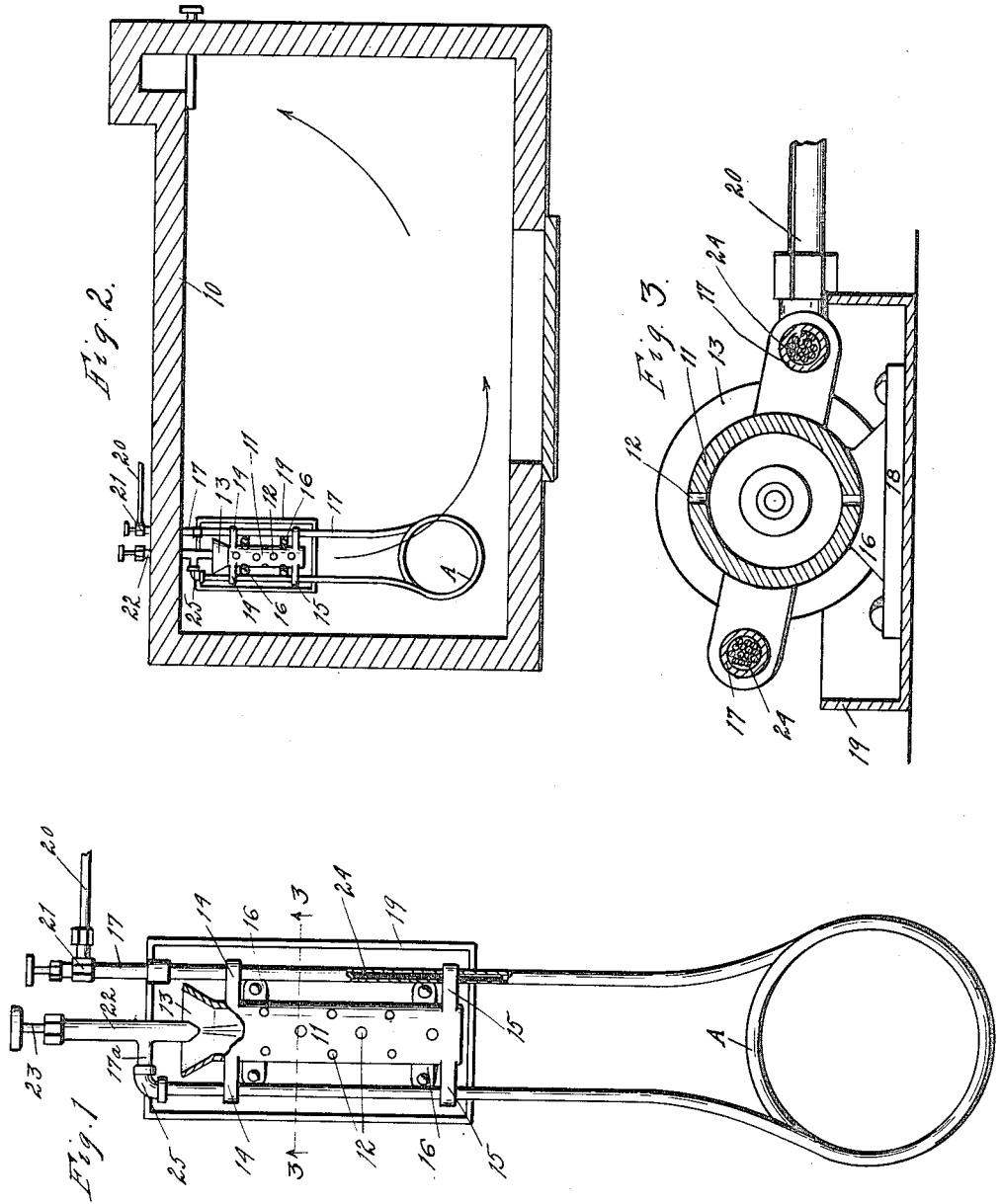

LLOYD A. UNGLES, OF DES MOINES, IOWA.

OIL-BURNER.

1,154,221. Specification of Letters Patent. Patented Sept. 21, 1915.

Application filed March 16, 1915. Serial No. 14,829.

*To all whom it may concern:*

Be it known that I, LLOYD A. UNGLES, a citizen of the United States, and resident of Des Moines, in the county of Polk and State of Iowa, have invented a certain new and useful Oil-Burner, of which the following is a specification.

The object of my invention is to provide a burner of simple, durable, and inexpensive construction.

More particularly it is my object to provide such a burner of the type adapted to burn kerosene or some such fuel, and which is particularly adapted for use in ovens.

A further object is to provide such a burner of simple construction, wherein the burner tube is of extremely simple construction, and serves as a support for the supply tube, which tube is so arranged as to subject the fuel to the heat from the burner.

My invention consists in the construction, arrangement, and combination of the various parts of the device, whereby the objects contemplated are attained, as hereinafter more fully set forth, pointed out in my claims and illustrated in the accompanying drawings, in which:

Figure 1 shows a top or plan view of a burner embodying my invention. Fig. 2 shows a top of plan view of the burner installed in an oven heating chamber, said chamber being shown in section, and Fig. 3 shows a detail sectional view taken on the line 3—3 of Fig. 1.

In the accompanying drawings I have used the reference numeral 10 to indicate generally an oven heating chamber, which may be of any suitable construction and shape.

My improved burner comprises a heating tube or burner tube 11, provided with holes 12 and open at both ends. The outer end is preferably flared at 13.

On the burner tube 11 are pairs of opposite laterally extending lugs, one pair being indicated by the numeral 14, and the other pair being indicated by the numeral 15. Formed on the burner tube 11 are downwardly extending supports 16. The lugs 14 and 15 are adapted to receive and support the fuel supply pipe 17, which is slidably extended through the opening in said lugs. The supporting members 16 are provided with flanges 18 adapted to be bolted or otherwise secured to a pan or the like 19. It will be seen that the construction of the burner tube shown, is extremely simple and inexpensive, and furnishes proper supports for the supply tube and also for the pan 19. The arrangement of the lugs 14 and 15 furnishes a convenient and inexpensive means for supporting the fuel supply tube, and in such a way as to locate the coil A of said tube in position to be heated by the flame from the burner tube for the purposes hereinafter more fully referred to. In this connection it may be mentioned that the lugs 14 and 15 on one side of the burner tube 11 are higher than the lugs 14 and 15 on the other side, so that the oil and gas is given an actual rise during its progress through the tube 17. It may be also mentioned that the coil A is spaced from the end of burner 11, so as to be deep in the oven for the purpose of locating it in the part of the oven that is always warm, and as free as possible from cold air coming in at the oven door or door of the burner chamber.

The fuel supply tube 17 extends longitudinally beyond the outer end of the burner tube 11, as illustrated in Fig. 1, and is designed to be connected with the tube 20. The flow of fuel from the tube 20 to the tube 17 is controlled by a valve 21. The tube 17 is extended through the lugs 14 and 15 on one side of the burner tube 11, and considerably beyond the forward end of said tube, and is there bent into the coil A which is substantially on a horizontal level with the tube 11 and spaced from the tube 11 a proper distance. The tube 17 is then extended through the lugs 14 and 15 on the opposite side of the tube 11 to a point beyond the outer end of the tube 11, where said tube 17 is extended laterally at 17$^a$ to a point spaced from the outer end of the tube 11.

A burner nozzle 22 communicates with the extension 17$^a$, and is adapted to discharge its contents into the flaring end 13 of the tube 11. The flow of gas or fuel from the burner is controlled by a valve 23 having a stem. Received within the portion of the tube 17, which communicates with the tube 20 and extending from the beginning of the coil A, are a plurality of rods 24.

In the practical use of my improved burner, it will be noted that the tube 17, and the nozzle 22 are extended beyond the outer end of the burner tube 11 sufficiently to be mounted in the wall of the burner chamber 10 for supporting my burner on said wall. A proper junction member or elbow 25 is used for connecting the tube 17 with the extension 17ª. It will readily be seen that by sliding the lugs 14 and 15 on the tube 17, the nozzle can be removed from the tube 17.

The apparatus having been installed in the proper chamber, the oil or other fuel may be burned in the pan 19 and a little oil may be permitted to flow into the tube 11.

The heat from the fuel in the pan 19 will generate gas in the tube 11, whereupon the gas thus generated may be lighted, and the flame will be driven against and around the coil A, whereby gas will continue to be formed from fuel supplied to the tube 17.

In installing my improved burner it is only necessary to cut two small holes in the wall of the chamber 10. The outer ends of the members 22 and 17 are extended through the holes in the wall and the connecting parts are then mounted on said outer ends.

By removing the nozzle and the member 25, and removing the connecting parts from the member 17, the supply tube may be readily removed from the other parts on the burner for repairing or replacing it. The parts are all readily detachable, so that they may be readily taken apart for transportation, storage or repair.

The wires 24 are placed in the tube 17 for the reason that I have discovered that kerosene or other fuels break up more readily when such wires are used.

It will be understood that some changes may be made in the arrangement and construction of the parts of my improved burner without departing from its essential features and purposes, and it is my intent to cover by this application any such changes which may be included within the scope of my claims.

I claim as my invention.

1. In an oil burner, a burner tube, a fuel supply tube slidably mounted on said burner tube and formed into a coil in front of the burner tube, a burner nozzle on said supply tube arranged to discharge into said burner tube, said tube being arranged to discharge at last on said coil, said supply tube being slidably mounted on the burner tube to permit of varying the distance of the coil from the burner tube.

2. In a device of the class described a burner tube open at both ends, said burner tube being provided with pairs of oppositely extending lugs, a fuel supply tube having one end extending beyond said outer end of said burner tube, and being slidably extended through the lugs on one side of said burner tube, then formed into a coil in front of the discharge end of the burner tube, then slidably extended through the lugs on the opposite side of said burner tube, a fuel nozzle on one end of said supply tube arranged to discharge into said burner tube, said fuel nozzle and part of said supply tube adapted to be extended beyond the outer end of said burner tube, and adapted to be mounted in the wall of a furnace or the like for supporting the device on said wall, said last described portion of the supply tube and said nozzle being provided with parts at their outer ends capable of being removed for permitting the insertion of the nozzle and the supply tube into the openings in a wall.

Des Moines, Iowa, February 26, 1915.

LLOYD A. UNGLES.

Witnesses:
A. SHERMAN,
J. MAHER.